(12) United States Patent
Pohlack et al.

(10) Patent No.: US 8,943,278 B2
(45) Date of Patent: Jan. 27, 2015

(54) PROTECTING LARGE REGIONS WITHOUT OPERATING-SYSTEM SUPPORT

(75) Inventors: Martin T. Pohlack, Dresden (DE); Stephan Diestelhorst, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 262 days.

(21) Appl. No.: 13/563,143

(22) Filed: Jul. 31, 2012

(65) Prior Publication Data
US 2014/0040554 A1  Feb. 6, 2014

(51) Int. Cl.
*G06F 12/00* (2006.01)
(52) U.S. Cl.
USPC .......................................................... 711/150
(58) Field of Classification Search
CPC ........................................................ G06F 9/52
See application file for complete search history.

(56) References Cited

U.S. PATENT DOCUMENTS

| | | | | |
|---|---|---|---|---|
| 5,613,086 | A * | 3/1997 | Frey et al. | 711/152 |
| 6,496,909 | B1 * | 12/2002 | Schimmel | 711/163 |
| 7,257,814 | B1 | 8/2007 | Melvin et al. | |
| 7,409,525 | B1 * | 8/2008 | Clark et al. | 711/206 |
| 7,921,250 | B2 | 4/2011 | Lee | |
| 8,209,689 | B2 | 6/2012 | Raikin et al. | |
| 2009/0172292 | A1 | 7/2009 | Saha et al. | |
| 2010/0023703 | A1 | 1/2010 | Christie et al. | |
| 2010/0023704 | A1 | 1/2010 | Christie et al. | |
| 2010/0023706 | A1 | 1/2010 | Christie et al. | |
| 2010/0023707 | A1 | 1/2010 | Hohmuth et al. | |
| 2011/0252203 | A1 | 10/2011 | Kottapalli et al. | |
| 2012/0167106 | A1 | 6/2012 | Shpeisman et al. | |

OTHER PUBLICATIONS

Wikipedia, ABA problem, http://en.wikipedia.org/wiki/ABA_problem, printed Jul. 13, 2012.
S. Diestelhorst et al., Hardware Acceleration for Lock-Free Data Structures and Software-Transactional Memory, Aug. 14, 2008.
Advanced Micro Devices, Inc Advanced Synchronization Facility, Proposed Architectural Specification, Rev. 2.1, Mar. 2009.
D. Christie et al., Evaluation of AMD's Advanced Synchronization Facility Within a Complete Transactional Memory Stack, 2010.
AMD Publications, http://www.amd64.org/publications.html, printed Mar. 7, 2011.
H. E. Ramadan et al., Dependence-Aware Transactional Memory for Increased Concurrency, http://www.cs.utexas.edu/~rossbach/pubs/tx-micro08.pdf.

* cited by examiner

*Primary Examiner* — Hiep Nguyen
(74) *Attorney, Agent, or Firm* — Volpe and Koenig, P.C.

(57) ABSTRACT

A system and method for providing very large read-sets for hardware transactional memory with limited hardware support by monitoring meta data such as page table entries. The system and method include a Hardware-based Transactional Memory (HTM) mechanism that tracks meta-data such as page-table entries (PTE) rather than all the data itself. The HTM mechanism protects large regions of memory by providing conflict detection so that regions of memory can be located within a local read or write set.

24 Claims, 5 Drawing Sheets

PROTECTING LARGE REGIONS WITHOUT OPERATING-SYSTEM SUPPORT

TECHNICAL FIELD

The disclosed embodiments relate generally to information processing systems. More specifically, the disclosed embodiments provide an improved system and method for protecting large regions within a hardware transactional memory without operating system support.

BACKGROUND

Virtual memory allows a processor to address a memory space that is larger than physical memory. The translation between physical memory and virtual memory is typically performed using page tables. Often several page table levels are employed, where each page table level helps in translating a part of the virtual address. For instructions that access memory, virtual addresses need to be translated to physical memory using the page tables. A Translation Lookaside Buffer (TLB) cache is common in processors to facilitate translations between the physical and virtual memory. TLBs are populated via different mechanisms, for example, for AMD64 type processor architecture, the processor employs a page-table walker that establishes required translations and fills the TLB.

If page tables change and a re-walk is desired, TLBs often need to be flushed to trigger a new page-table walk operation. This operation is usually desired when the operating system determines that the TLB entries should be filled again. The "walk" refers to the process of going through (i.e., walking) the page-table to establish a virtual to physical mapping. A page-table walker performs the page-table walk operation. The page-table walker sets ACCESSED/DIRTY bits depending on the access type (load/store) upon first access. Generally, the processor does not clear these bits. The operating system (OS) can use these bits to determine which memory pages have been accessed and how they have been accessed. Often, these bits need to be cleared in page tables to force a store to the page table entry (PTE) upon page table walks on other processors. Additionally, remote TLB shoot down can be used to remove translations from remote TLBs for which a re-walk is desired.

Shared-memory computer systems (e.g., computer systems that include multiple processors) allow multiple concurrent threads of execution to access shared memory locations. Unfortunately, writing correct multi-threaded programs is difficult due to the complexities of coordinating concurrent memory access. One approach to concurrency control between multiple threads of execution is transactional memory. In a transactional memory programming model, a programmer may designate a section of code (e.g., an execution path or a set of program instructions) as a "transaction," which a transactional memory system should execute atomically with respect to other threads of execution. For example, if the transaction includes two memory store operations, then the transactional memory system ensures that all other threads may only observe either the cumulative effects of both memory operations or of neither, but not the effects of only one.

Various transactional memory systems have been proposed, including those implemented by software, by hardware, or by a combination thereof. However, many traditional implementations are bound by various limitations. For example, hardware-based transactional memory (HTM) proposals sometimes impose limitations on the size of transactions supported (i.e., maximum number of speculative memory operations that can be executed before the transaction is committed). Often, this may be a product of limited hardware resources, such as the size of one or more speculative data buffers used to buffer speculative data during transactional execution.

One example of a transactional memory system is the Advanced Synchronization Facility (ASF) proposed by Advanced Micro Devices (AMD). The ASF allows user and system level code to modify a set of memory objects atomically without requiring expensive synchronization mechanisms. Unfortunately, in transactional memory systems such as the ASF, tracking large read sets requires large amounts of hardware resources.

SUMMARY OF EMBODIMENTS

A system and method are disclosed for providing very large read-sets (i.e., read sets that are larger than can be achieved by directly tracking system data) for hardware transactional memory with limited hardware support (i.e., transactional memory systems that do not have an ability to access large regions of transactional memory) by monitoring meta data such as page table entries.

In some embodiments, an HTM mechanism tracks metadata such as page-table entries (PTE) rather than the data itself. The HTM mechanism protects large regions of memory by providing conflict detection so that regions of memory can be located within a local read or write set. In some embodiments, the HTM mechanism functions at a cache-line level. However, it will be appreciated that while the term cache line is used to refer to units protected by the HTM, other units may also be protected. Also, in some embodiments, an ASF mechanism follows an early-abort principle and realizes a requester-wins strategy.

In some embodiments, using the HTM mechanism to protect large regions via the meta-data operates on transactional a read set (i.e., all the memory addresses and items (other than writes) being accessed inside a transaction) because no backing store is available for actually modified cache lines. Accordingly, the HTM mechanism uses a traditional HTM approach for protecting speculatively written cache lines. Since storage for old values is not required for cache lines that belong in a transactions (TXs) read set, it is possible to apply the large region protection at a meta-level (e.g., at the page table mechanism).

In some embodiments, an apparatus includes a processor coupleable to a shared memory that is shared by one or more other processors. The processor is configured to execute a section of code that includes a plurality of memory access operations to the shared memory. The processor includes a large region protection module which is configured to allow protection of a large region of memory, the large region of memory being larger than a memory line, by monitoring meta data relating to the large region of memory.

BRIEF DESCRIPTION OF THE DRAWINGS

The disclosed embodiments may be better understood, and its numerous objects, features and advantages made apparent to those skilled in the art by referencing the accompanying drawings. The use of the same reference number throughout the several Figures designates a like or similar element.

DETAILED DESCRIPTION

Transactional memory systems may allow software threads in multi-threaded systems to access (read and/or write) a set of shared memory locations atomically with respect to other threads, without requiring the overhead and programming complexity associated with traditional synchronization mechanisms such as mutual-exclusion using locks. However, further techniques are necessary for increasing the efficiency of transactional memory systems.

According to some embodiments, various hardware mechanisms may be used to implement efficient transactional memory mechanisms, as described herein. In some embodiments, computationally inexpensive primitives (e.g., program instructions) are defined for instructing hardware to perform various synchronization functions, which may be used to synthesize higher-level synchronization mechanisms. The hardware mechanisms and/or program instructions may collectively be referred to as the Advanced Synchronization Facility (ASF).

In some embodiments, an existing processor architecture (e.g., x86) is augmented to implement ASF mechanisms. The remainder of this disclosure describes how the 64-bit x86 architecture AMD64 may be augmented with ASF mechanisms to implement transactional memory. However, these example embodiments are not intended to limit ASF mechanisms to this architecture alone and given the benefit of this disclosure, implementations of ASF mechanisms in other processor architectures will become evident to those skilled in the art.

Figure 1:
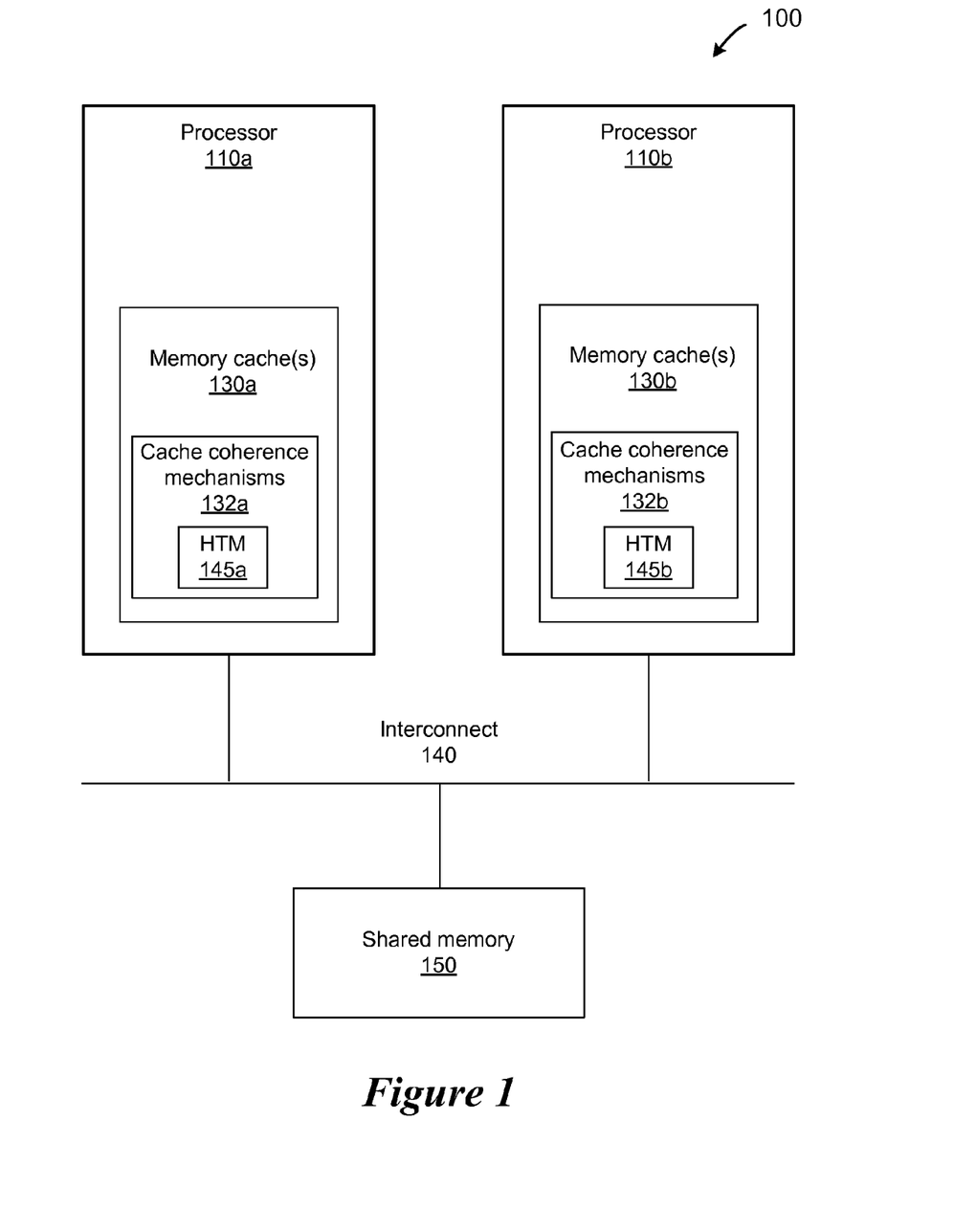
FIG. 1 is a generalized block diagram showing components of a multi-processor computer system configured to implement an advanced synchronization facility, in accordance with some embodiments.

FIG. 1 is a block diagram illustrating components of a multi-processor computer system configured to implement ASF, according to some embodiments. According to the illustrated embodiment, computer system 100 may include multiple processors, such as processors 110a and 110b. In some embodiments, processors 110 may comprise multiple physical or logical (e.g., SMT) cores and be coupled to each other and/or to shared memory 150 over interconnect 140. In some embodiments, different interconnects may be used, such as a shared system bus or a point-to-point network in various topographies (e.g., fully connected, torus, etc.).

According to the illustrated embodiment, each processor 110 may include one or more levels of memory caches 130. Levels of memory caches may be hierarchically arranged (e.g., L1 cache, L2 cache, L3 cache, etc.) and may be used to cache local copies of values stored in shared memory 150.

In some embodiments, memory caches 130 include cache coherence mechanisms 132. In some embodiments, cache-coherence mechanisms 132 implement a cache coherence communication protocol among the interconnected processors to ensure that the values contained in memory caches 130 of each processor 110 are coherent with values stored in shared memory 150 and/or in the memory caches 130 of other processors 110. Such protocols include the MESI (modified, exclusive, shared, invalid) cache coherence protocol and MOESI (modified, owned, exclusive, shared, invalid) cache coherence protocol. Cache coherence protocols may define a set of messages and rules by which processors may inform one another of modifications to shared data and thereby maintain cache coherence. For example, according to the MESI protocol, each block stored in a cache is marked as being in one of four states: modified, exclusive, shared, or invalid. A given protocol defines a set of messages and rules for sending and interpreting those messages, by which processors maintain the proper markings on each block. Depending on the state of a given cache block, a processor may be restricted from performing certain operations. For example, a processor may not execute program instructions that depend on a cache block that is marked as invalid. In some embodiments, cache coherence mechanisms are implemented in hardware, software, or a combination thereof. Cache coherence messages may be may be communicated across interconnect 140 and may be broadcast or point-to-point.

The cache coherence mechanism 132 may further include HTM mechanisms 145. The HTM mechanisms 145 enable very large read-sets for hardware transactional memory with by monitoring meta data. More specifically, the HTM mechanism 145 tracks meta-data such as page-table entries (PTE) rather than the data itself. The HTM mechanism 145 protects large regions of memory by providing conflict detection so that regions of memory can be located within a transaction read or write set of the processor. In some embodiments, the HTM mechanism 145 functions at a cache-line level. However, it will be appreciated that while the term "cache line" is used to refer to units protected by the HTM mechanism 145, other units may also be protected. Also, in some embodiments, an ASF mechanism follows an early-abort principle and realizes a requester-wins strategy.

In some embodiments, using the HTM mechanism 145 to protect large regions via the meta-data operates with a transaction read set because no backing store is available for actually modified cache lines. Accordingly, the HTM mechanism 145 uses a traditional HTM approach for protect speculatively written cache lines. Since storage for old values is not required for cache lines that belong in a transactions (TXs) read set, it is possible to apply the large region protection at a meta-level (e.g., at the page table mechanism).

Figure 2:
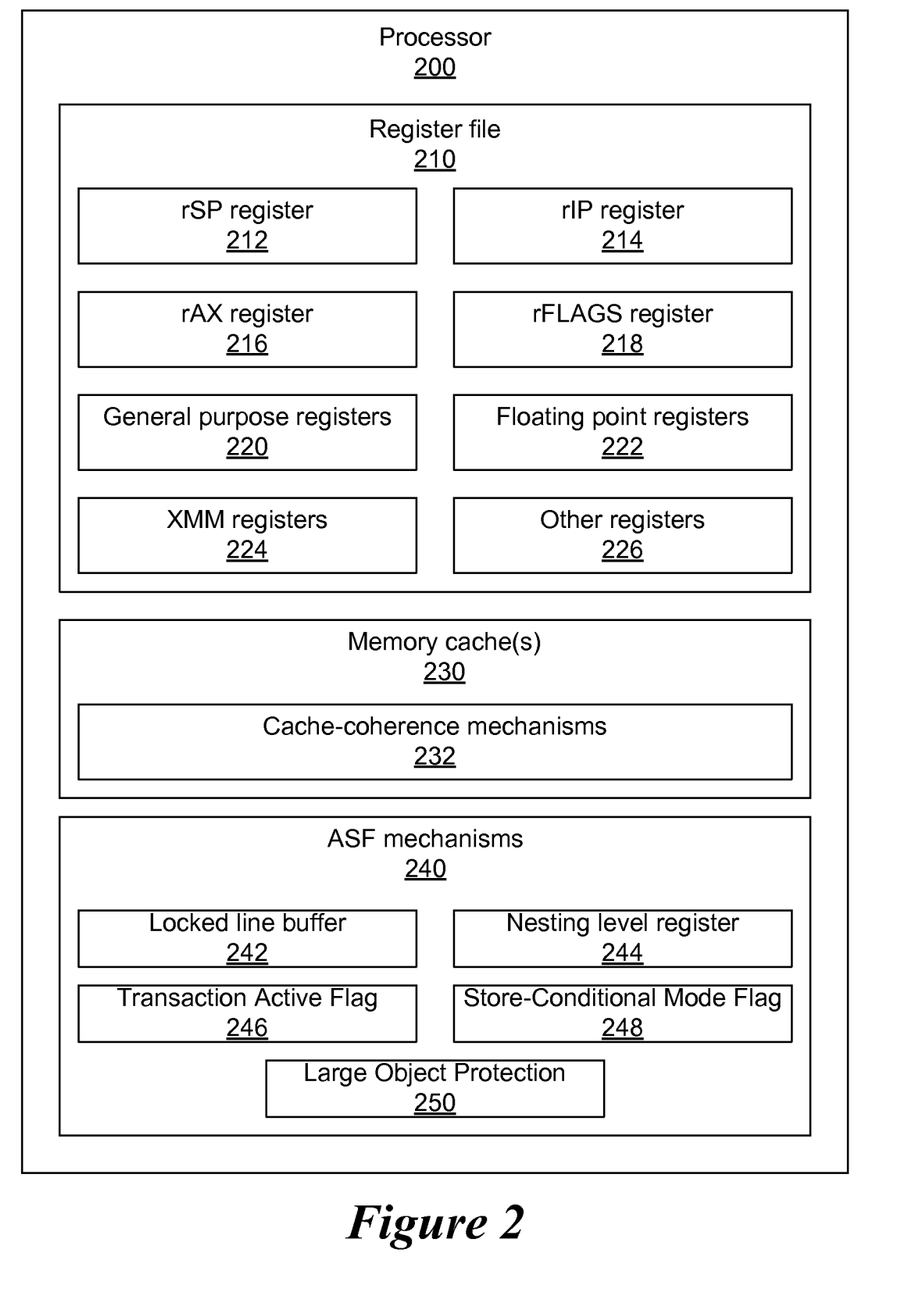
FIG. 2 is a block diagram showing a more detailed view of components comprising a processor, in accordance with some embodiments.

FIG. 2 is a block diagram illustrating a more detailed view of components comprising a processor, such as processors 110, according to some embodiment. According to the illustrated embodiment of FIG. 2, processor 200 comprises register file 210, which may include various registers, each of which may be of any size (e.g., 16-bit, 32-bit, 64-bit, 128-bit, etc.). For example, register file 210 may include various known x86 registers, such as rSP register 212 (stack pointer), rIP register 214 (instruction pointer), rAX register 216 (accumulator register), and/or rFLAGS register 218 (flags register indicating processor state). In some embodiments, register file 210 may further comprise any number of general purpose registers 220 and/or floating point registers 222. In some embodiments, register file 210 includes one or more 128-bit registers, such as XMM registers 224. In some embodiments, register file 210 includes any number of other registers 226, which may be of various sizes.

According to the illustrated embodiment in FIG. 2, processor 200 includes memory caches 230 for storing local copies of values stored in shared memory 150 and includes cache-coherence mechanisms 232 for maintaining the consistency of those values across various copies dispersed within shared memory 150, the caches 230, and other caches. In some embodiments, processor 200 includes ASF mechanisms 240 for implementing transactional synchronization mechanisms, as described herein. In some embodiments, ASF mechanisms 240 include the data structures and/or logic to implement memory transactions, as described herein. In some embodiments, ASF mechanisms 240 include a locked line buffer 242, which may be used in case of an abort to roll back memory changes made by a partially executed transaction, as described below. In some embodiments, ASF mechanisms 240 include a nesting level register 244, which may hold a value indicating the depth to which the current transaction is nested in other transactions, as described below in more detail. In some embodiments ASF mechanisms 240 include a flag to indicate whether a transaction is active, such as transaction active flag 246. In some embodiments, ASF mechanisms 240 include a flag indicating a transactional mode, such as store-conditional mode flag 248, which may be set to indicate whether an executing transaction is executing in store-conditional mode or in another mode. In some embodiments, other flags and/or registers may be implemented in ASF mechanisms 240 in support of transactional execution.

According to the illustrated embodiment, ASF mechanisms 240 may include data structures and/or logic to implement a large region protection module 250 such as an HTM mechanism 145.

Figure 3:
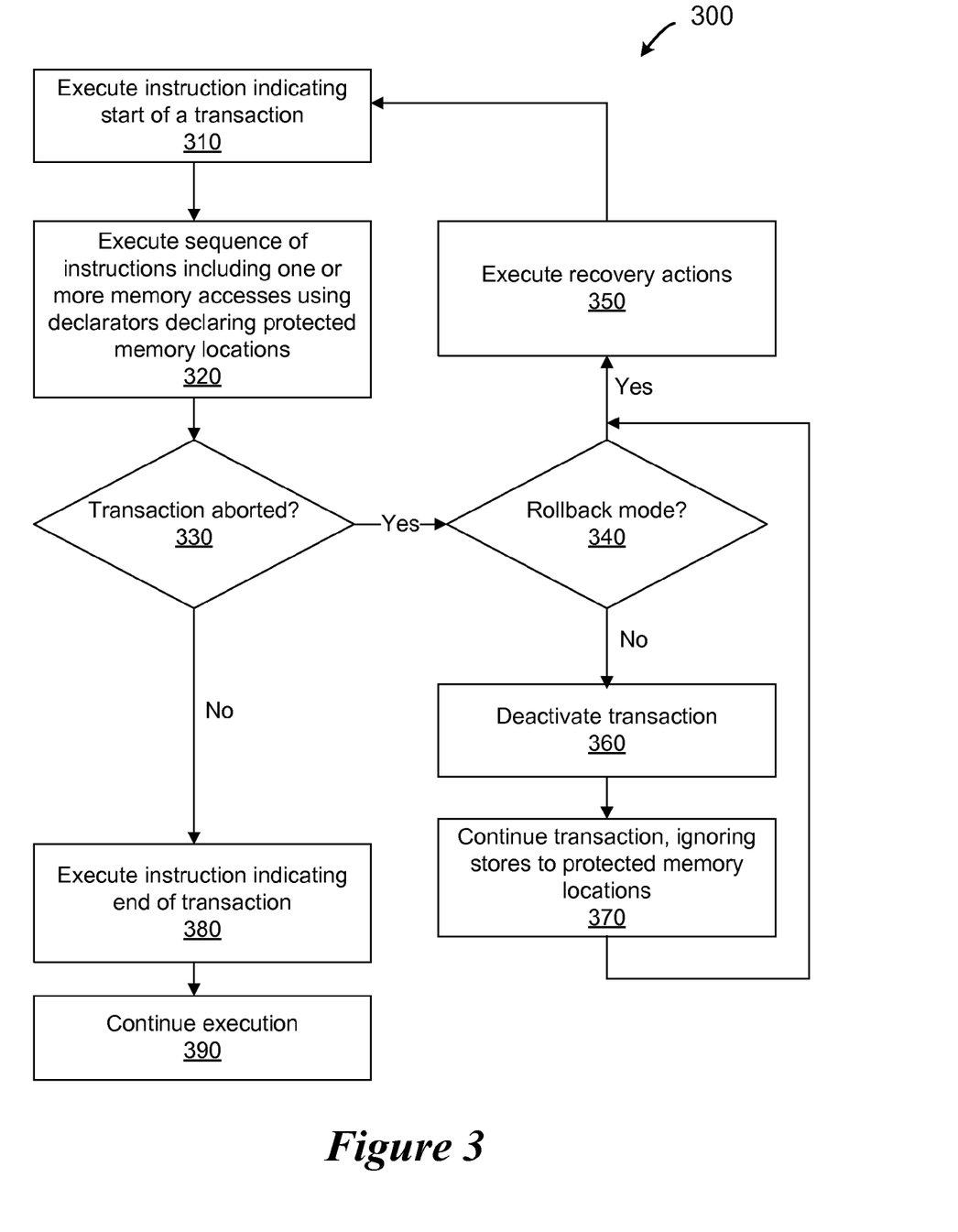
FIG. 3 is a general flow diagram showing a method for executing a transaction using an ASF, in accordance with some embodiments.

FIG. 3 is a general flow diagram illustrating a method for executing a transaction using ASF, according to some embodiments. According to the illustrated embodiment, ASF may allow software (e.g., a thread) to begin a transaction (i.e., a critical section of code) by executing a given instruction (or multiple instructions) indicating the start of a transaction, as in 310. In some embodiments, an ASF instruction (e.g., a SPECULATE instruction, a BEGIN instruction) is used to indicate the start of a critical section.

After beginning a transaction, the thread may execute a series of instructions comprising the transaction body, as in 320. Such instructions may include a number of memory access (read and/or write) operations, some number of which may designate that the accessed memory location should be protected. A thread may designate that a given memory location should be protected by using one or more declaratory instructions provided by ASF. ASF mechanisms may ensure that access to protected memory (as designated by declarator instructions) occur atomically with respect to all other concurrently executing threads in the system (i.e., all at once or not at all). For example, if the transaction includes multiple protected writes to memory, then ASF mechanisms may ensure that no other thread may observe the result of only a subset of those protected writes to memory. In some embodiments, if the transaction includes one or more protected memory read operations, then ASF mechanisms ensure that the transaction completes successfully only if no other thread has modified the protected read locations before the transaction has completed. In some embodiments, a "memory location" protected by a declarator operation may be of different sizes, such as that of a system dependent cache block or of another size.

In some embodiments, ASF only protects cache lines that have been specified using designated declarator instructions. In these embodiments, all other memory locations may remain unprotected and may be modified inside a critical section using standard x86 instructions. These modifications to unprotected memory may become visible to other processors immediately upon execution, for example, in program order. In some embodiments, a transaction body (e.g., instructions executed in 320) may comprise one or more other transactions (i.e., nested transactions).

In some embodiments, if one or more conditions of the transactional execution have been violated, the transaction aborts (as indicated by the affirmative exit from 330). In some embodiments, transactional attempts are aborted at any point because of contention with other processors, far control transfers (such as those caused by interrupt and faults), execution of explicit software ABORT instructions, insufficient hardware resources, other implementation-specific conditions, etc.

When a transactional attempt aborts, particular recovery actions may be taken depending on the mode of transactional execution. In some embodiments, for each transaction, ASF supports a rollback mode of execution and/or a store-conditional mode of execution. In some embodiments, the mode of execution determines what actions are performed in response to a transactional attempt being aborted. For example, in some embodiments, aborting a transaction in rollback mode causes execution to be "rolled back" to the start of the transaction while aborting a transactional attempt in store-conditional mode causes the transaction to continue but with transactional store operations not being performed (i.e., execution of transactional stores may be conditional on the transaction not having been aborted).

According to the illustrated embodiment, when a transaction executing in rollback mode aborts (as indicated by the affirmative exit from 340), ASF mechanisms may be configured to execute recovery actions, as in 350, which may include discarding modifications to the contents of the protected lines. By discarding such modifications, as in 350, ASF mechanisms may cause the modifications to be unobservable to other threads in the system, thereby complying by the atomicity property of the transaction. However, ASF mechanisms may be configured to not roll back modifications to unprotected memory, such as those performed using conventional x86 memory instructions. In some embodiments, the application programmer provides software for accommodating these unprotected modifications, such as software recovery routines configured to reenter an initialization sequence leading up to the critical section.

In some embodiments, the recovery actions of 350 may are configured to roll back only a subset of the system registers (e.g., rIP and rSP) rather than all registers. In these embodiments, software may therefore be written to not rely on the content of various registers when entering transactional execution (e.g., by ignoring the initial contents of some registers after an abort event and/or to not modifying various registers during transactional execution).

In some instances, before an interrupt or exception handler returns, operating system code or other processes may have executed in the interim. Furthermore, in some instances, other processes may have even executed ASF transactions that inspected and/or modified locations targeted by the interrupted transaction. In some embodiments, ASF mechanisms obviate these concerns by not maintaining any ASF-related state across context switches. Instead, in these embodiments, when the interrupted thread returns to the processor, ASF mechanisms may be configured to automatically abort and reattempt the transaction.

According to the illustrated embodiment, after executing some recovery action or actions, the thread may then reattempt the transaction, as indicated by the feedback loop from 350 to 310.

In some embodiments, an abort of a transaction executing in store-conditional mode (as indicated by the negative exit from 340) is handled differently from an abort of a transaction executing in rollback (as indicated by the affirmative exit from 340). For example, while an abort of a rollback mode transaction may automatically reset execution flow to the beginning of the critical section (or to other recovery code), an abort of a transaction in store-conditional mode may be handled by undoing or otherwise discarding changes made by the critical section to values in protected memory locations and then and "deactivating" the transaction, as in 360. In some embodiments, deactivating the transaction includes setting a status code indicating that an abort has occurred and/or that the transaction is no longer active. In store-conditional mode, after the transaction is deactivated (as in 360), the system may continue to execute the critical section without executing any store operations to protected memory locations (as in 370). For example, after the transaction is deactivated, subsequent store operations to protected memory locations may be treated as no-ops.

In some embodiments, when the aborted transaction completes, a status code is set in a register, such as rAX register 216 to indicate that the transaction was aborted. In some embodiments, the thread is configured to detect that an abort status code has been set and perform one or more recovery actions, as indicated by the feedback loop from 370 to 350. In some embodiments, the recovery actions of 350 is different for transactions that were aborted in store-conditional mode (i.e., from 370) than for those that were aborted in rollback mode (i.e., from 340). A more detailed discussion of transactions in rollback and store-conditional modes is provided below.

According to the illustrated embodiment, once the transaction body has been completed, the thread may execute one or more instructions indicating the end of the transaction to the ASF mechanisms, as in 380, such as a COMMIT instruction as discussed below. After committing the transaction, as in 380, the thread may continue execution, as in 390.

In some embodiments, ASF supports nesting of one or more transactions within one or more other transactions. For example, after a transaction is started as in 310 e.g., by executing a SPECULATE command), the instructions of the transaction body being executed in 320 may begin another transaction (e.g., by executing another SPECULATE command) before the first transaction completed. In this case, the second ("child") transaction may be said to be "nested" within the first ("parent") transaction. A transaction that is not nested within any other transaction may be referred to herein as a "top-level" transaction.

According to some embodiments, if one or more conditions of the transactional execution have been violated, then the transaction aborts (as indicated by the affirmative exit from 330). In some embodiments, transactional attempts are aborted at any point because of contention with other processors, far control transfers (such as those caused by interrupt and faults), execution of explicit software ABORT instructions, insufficient hardware resources, other implementation-specific conditions, etc.

Various ASF mechanisms may be used to monitor and/or enforce protected memory locations (e.g., protected cache blocks). In some embodiments, ASF mechanisms include an extension to one or more of the system's caches (e.g., memory caches 230), to indicate which cache lines (i.e., blocks) are protected. For example, in some embodiments, each line in a given cache includes a "protected" flag, which is set if the cache line is protected in a currently executing transaction and unset if it is not protected. In some embodiments, the protected flag includes one or more bits.

In some embodiments, ASF mechanisms for tracking protected cache lines include a locked line buffer. In these embodiments, when a value in a protected memory location is modified (e.g., using a LOCK MOV instruction), an entry may be made into the locked line buffer to indicate the cache block and the value it held before the modification. In these embodiments, in the event of an abort of the transaction, the entries of the locked line buffer may be used to restore the pre-transaction values of each protected cache line to the local cache. In these embodiments, the locked line buffer may participate in a cache coherence protocol of the system, as described below.

Instead of using a locked line buffer to undo memory stores as described above, various ASF implements may instead prevent store instructions to protected memory locations in a critical section from being written to cache and/or memory before the transaction is committed. In some embodiments, ASF is configured to keep all memory modifications in an internal store buffer and forward buffered values to subsequent load operations in the transaction. In these embodiments, once the transaction commits, ASF mechanisms may allow the buffered store operations in the internal store buffer to be written back to the cache.

Due to the fixed capacity of various ASF hardware components, various limitations may exist on the number of memory locations that may be simultaneously protected during a transaction (or set of nested transactions). For example, in some embodiments, an ASF implementation may specify that all protected memory locations simultaneously reside in a data cache (e.g., memory caches 230) for the duration of the critical section. In these embodiments, if a protected line is evicted from the cache during a transaction (e.g., due to capacity constraints), the critical section may be aborted. For example, a critical section that happened to reference N+1 memory locations that all mapped to the same set in an Nway associative data cache may fail to complete since at least one protected cache line would be evicted from cache when protected memory location N+1 is accessed. However, if a transaction performs a more distributed reference pattern, then it may be able to concurrently protect more memory locations than N before any one cache index is exceeded and a protected line is displaced from the data cache.

Capacity limitations other than cache associativity may exist. For example, in some embodiments, when a locked line buffer is used, the maximum number of concurrently protected modified memory locations is determined by the capacity of the locked line buffer. In another example, in some embodiments, when a store buffering scheme is used, ASF hardware capacity is dependent on the capacity of the store buffer (i.e., the maximum number of outstanding stores supported by the system pipeline).

In some embodiments, ASF mechanisms guarantee that a critical section will not fail due to insufficient hardware capacity as long as the number of protected locations does not exceed a given minimum guaranteed capacity. In some embodiments, this guarantee may be made regardless of where in the cacheable address space protected memory locations reside. For example, in some embodiments, when all protected memory locations simultaneously reside in a data cache, the minimum guaranteed capacity is dependent upon the data cache's associativity (i.e., size of associativity sets). In some embodiments, if a transaction exceeds the hardware capacity, then the transactional attempt may abort.

As described above, in some embodiments, if a transaction attempts to protect (using declarators) more memory locations (e.g., cache blocks) than the ASF implementation's capacity can support, the transaction is aborted. In some embodiments, the transaction is aborted in response to a fault being raised.

Transactional aborts may also be caused by conditions other than insufficient hardware capacity. For example, an abort may be caused by memory contention, that is, interference caused by another processor attempting to access protected memory locations. In some embodiments, ASF mechanisms are configured to detect cache coherence messages (e.g., invalidating and/or noninvalidating probes) that are relevant to one or more protected cache lines and determine whether the probe indicates that a data conflict exists. In response to detecting a data conflict, the ASF-mechanism may abort a transactional attempt. For example, consider a first thread executing in transactional mode and protecting a memory location (i.e., reading a memory location using a declarator instruction). If a second thread subsequently attempts a store to the protected memory location, then the processor executing the second thread may send an invalidating probe to the processor executing the first thread, in accordance with the particular cache coherence protocol deployed by the system. If the first processor receives the invalidating probe while the memory location is still protected (e.g., before the first thread commits its transaction or otherwise releases the memory location) then a data conflict may exist. In such an instance, ASF mechanisms may be configured to detect that the invalidating probe is relevant to a protected memory location and in response, abort the first thread's transaction.

According to some embodiments, a transaction is aborted if ASF mechanisms detect that an invalidating probe relevant to a protected cache line is received. In some embodiments, a transaction is aborted if ASF mechanisms detect that a non-invalidating probe relevant to a modified protected cache line is received.

In some embodiments, ASF mechanisms allows read watches for read only memory areas where either there is no access right check for PREFETCHW or a PREFETCH-W_no_check instruction is defined. The PREFETCH-W_no_check enables the ASF mechanisms to protect memory lines (in some embodiments, a memory line includes 32-bytes, 64-bytes or 128-bytes of data) containing active page tables (i.e., memory lines accessed and updated by the page table walker of a processor). In some embodiments, the ASF mechanisms include an ASF_PROTECT_PT_AREA instruction which is similar to a LOCK MOV or PREFETCH instruction. The ASF_PROTECT_PT_AREA instruction walks page tables until a give level and issues a PREFETCH instruction of a target entry. The ASF_PROTECT_PT_AREA instruction includes a parameter that includes a virtual address in a target area (e.g., an ASF_PROTECTPT_AREA mem parameter). The ASF_PROTECT_PT_AREA instruction also provides information regarding a known minimal protected area (e.g., a single page of undefined level). The ASF_PROTECT_PT_AREA instruction also covers additional virtual area due to cache lines covering several page table entries or a potentially larger page size for a given address.

In some embodiments, the ASF_PROTECTPT_AREA instruction further includes a level parameter that describes a page table entry (PTE level (e.g., PTE:1), a page directory entry (PDE) level (e.g., PDE:2), a page directory pointer entry (PDPE) level (e.g., PDPE:3) and a page map level 4 entry (PML4E) level (e.g., PML4E:4). With this embodiment, the large object protection only occurs if the level matches with the actual page table.

In some embodiments, page boundary limits and page table mapping are adapted to coincide with the large object protection module 250. In these embodiments, a result level parameter is provided such as via a register. E.g., a parameter of 1 for 4K pages, 2 for 2M pages, etc. This embodiment also ensures that accessed and dirty bits are 0 to prevent a race with remote TLB shoot down.

Figure 4:
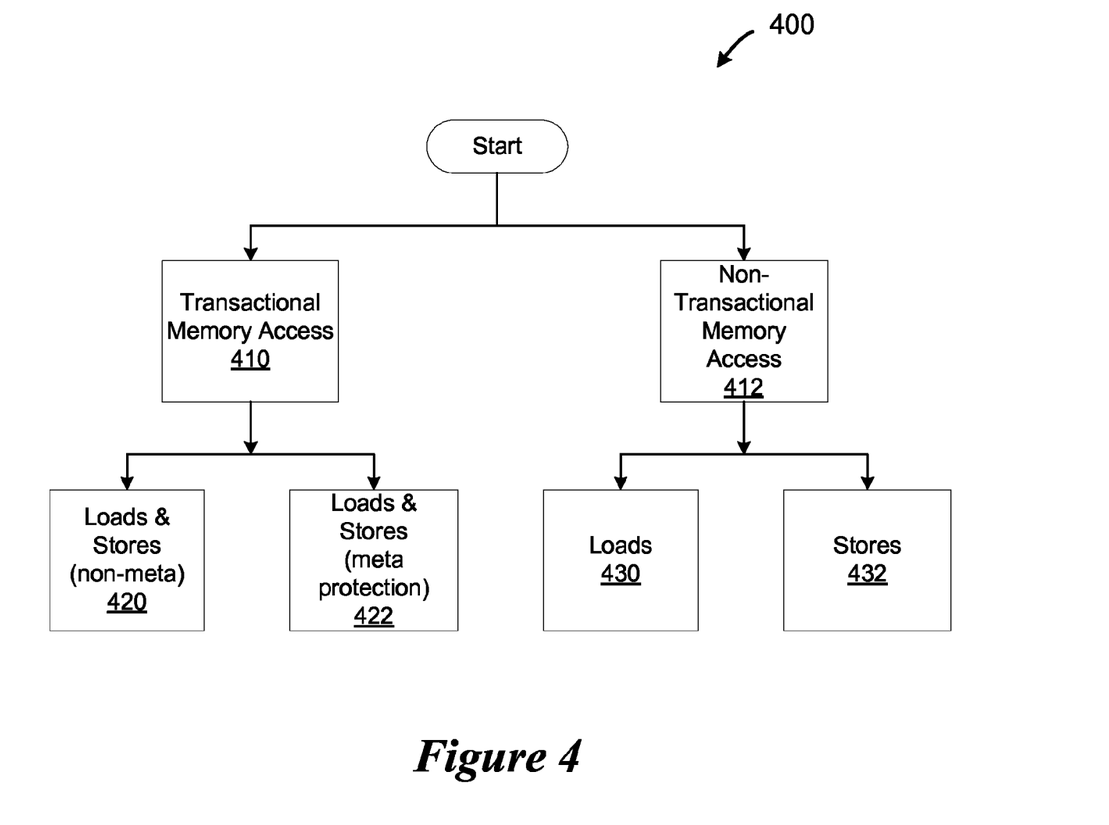
FIG. 4 is a generalized flow diagram showing a method for performing a large region protection operation, in accordance with some embodiments.

FIG. 4 a generalized flow diagram illustrating a method for performing a large region protection operation, according to some embodiments. According to the illustrated embodiment, the HTM mechanism 145 provides a large region protection function. The HTM mechanism 145 first determines whether a memory access is a transaction memory access (step 410) or a non-transactional memory access (step 412) In some embodiments, when detecting conflicts, the operating system does not access the ACCESSED/DIRTY bits, but rather the HTM mechanism 145 detects conflicts by accessing and analyzing meta-data such as page table entries. In some embodiments, the HTM mechanism 145 accesses an additional bit in each PTE that is not used by the OS. In some embodiments, each TLB entry includes a transaction read (TX-R) bit and a transaction write (TX-W) bit. The TX-R bit and the TX-W bit store whether an address is contained in the transaction's working set at a meta level. A transaction's working set generally includes a read set and a write set. Each of these sets includes all the memory lines that have been touched in a read or write mode within a transaction. Memory lines generally only belong to one set, so writing a line in the read set would move the line from the read set to the write set.

In some embodiments, when performing transactional loads and stores in which no meta protection is present (i.e., normal loads and stores) (step 420), for stores, the page table entry is added to the transactional write set to determine whether there are any conflicts on the meta data accesses. This increased granularity for write conflicts from cache lines to cache pages increases the protected memory region without operating system support. Additionally, with stores it is desirable to only perform a page walk operation once, so the HTM mechanism 145 caches the PTE in the transactional write (TX-W) bit of the TLB entry of the store.

In some embodiments, for stores in which the corresponding TX-W bit is already set within the TLB entry, nothing needs to be done. In some embodiments, if the corresponding TX-W bit is not already set within the TLB entry, then the HTM mechanism 145 sets the TX-W bit of the TLB entry, determines the page table entry address of the store, adds this page table entry address to the transactional write set and any potential remote transactions that had this page table entry in their read or write set are aborted.

In some embodiments, when performing transactional loads in which meta protection is present (step 422), if the corresponding transaction read bit (TX-R) corresponding to a TLB entry is already set, then nothing needs to be done. In some embodiments, if the corresponding transaction read bit (TX-R) corresponding to a TLB entry is not set, the HTM mechanism 145 sets the TX-R bit of the TLB entry, determines the page table entry address of the store, adds this page table entry address to the transactional read set, performs a remote TLB shoot down operation for TLB entries corresponding to the address and any potential remote transactions that had this page table entry in their write set are aborted.

In some embodiments, when performing non-transactional memory accesses (step 412), for loads, the HTM mechanism 145 triggers conflicts with the write-sets of remote transactions (step 430). For stores, the HTM mechanism 145 determines when a direct conflict with HTM write sets is present (step 432). The HTM mechanism 145 enforces a remote TLB shoot down when conflicts with a transaction read set are detected via meta-data access. More specifically, either the HTM mechanism 145 marks the PTE cache-line as written to trigger a conflict with a remote read-set that contains this line or the HTM mechanism 145 examines the cache-line to determine whether a TX-R bit has been set in the PTE. If the TX-R bit is set then the HTM mechanism 145 attempts to write to the PTE to trigger the remote abort operation. However, with the later operation the fact that a page-table walk is performed strongly hints at a remote shoot down, thus making this the less preferable operation.

The HTM mechanism 145 performs a plurality of functions when providing very large read-sets for hardware transactional memory with limited hardware support by monitoring meta data. In some embodiments, the HTM mechanism 145 determines whether to evict marked TLB entries, locates a PTE for a given virtual address, performs a commit and abort operation, provides functionality to allow transparent remote TLB shoot down operations, and accesses certain bits within PTEs.

When determining whether to evict marked TLB entries, as a transactional state is stored within local TLB entries, evicting the entries should be prevented. Evicting transactional entries by normal entries can be prevented, for example, by reserving a certain amount of TLB space or ways of the TLB for transactional entries. If an eviction cannot be prevented, the situation is similar to a capacity overflow in the HTM mechanism 145 and user code is signaled that a capacity error has occurred.

When locating a PTE for a given virtual address, the HTM mechanism 145 performs a plurality of functions. In some embodiments, the HTM mechanism 145 performs a new page table walk operation. In some embodiments, if the TLB contains links to a corresponding PTE, then the HTM mechanism 145 can access the PTE via this link. In some embodiments, the cache may include a partial page table translation (e.g., page walk caches). This partial page table translation may contain relevant information for speeding up some or all of the steps of a page table walk operation.

In some embodiments, when performing a commit or abort operation for large read sets, in addition to the functions that the HTM mechanism 145 performs for normal size read sets, the HTM mechanism 145 tracks large read sets. Potentially marked bits in the PTE are removed by performing a page-table walk operation without corresponding markings in a corresponding TLB. The marked bits need only be removed before the PTE for which the commit and abort operation is being performed is again used in a transaction. More specifically, the TX-R and TX-W bits in TLB entries are set to 0 (e.g., flash-cleared).

For a transparent remote TLB shoot down operation, a TLB shoot down operation is generally performed at the operating system level by sending inter processor interrupts (IPIs) to the operating system on remote cores. The operating system then functions on behalf of the sender of the request to flush TLB entries. This procedure usually requires both the sender and the recipient of the remote TLB shoot down operation to be in kernel space (i.e., executing within the operating system) at the time. In some embodiments, transparent IPIs are sent from microcode, without entering kernel space on either the sender or the recipient. In this case, the IPI is handled by microcode also by the recipient by flushing TLB entries indicated by the virtual address that is provided as a parameter to the IPI. In some embodiments, as a security measure, the IPI message contains the corresponding physical address or an address space identifier to only allow threads from the same address space to influence each other {e.g., protection against a timing attack).

In some embodiments, the HTM mechanism 145 accesses certain bits within PTEs. In some embodiments, the HTM mechanism 145 accesses an available for software (AVL) bit within the PTE which is presently reserved for system software. In some embodiments, the HTM mechanism 145 accesses bits within an available block of bits 52-62 of the page table entry. In some embodiments, the HTM mechanism 145 accesses bits within a reserved block of the PTE. For example, in page table entries for 2 MB page entries.

Figure 5:
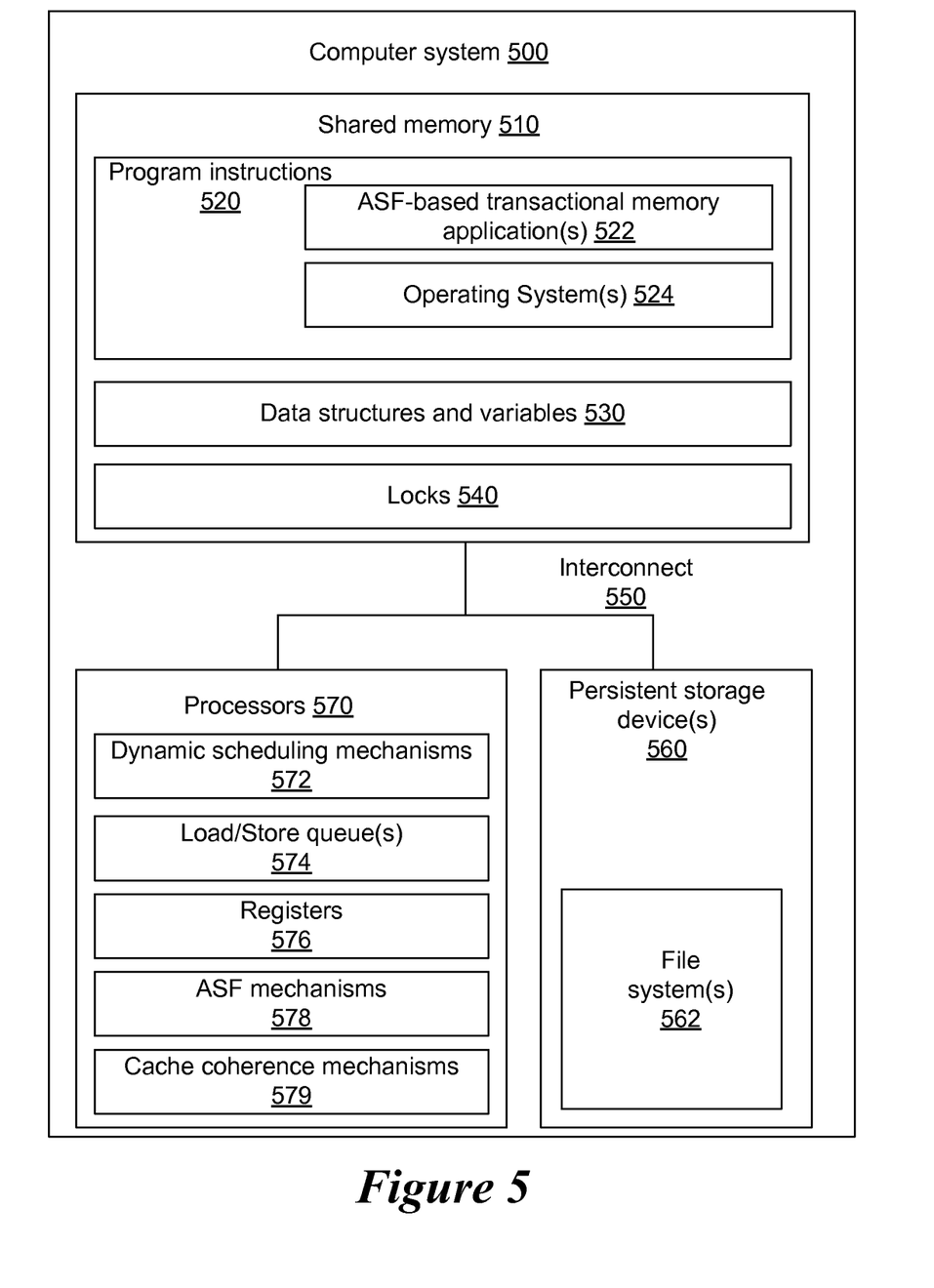
FIG. 5 is a generalized block diagram showing a computer system configured to implement various embodiments of an ASF, in accordance with some embodiments.

FIG. 5 illustrates one embodiment of a computer system configured to implement various embodiments of ASF, as described herein. Computer system 500 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

Computer system 500 may include a plurality of processors 570, each of which may include multiple cores, any of which may be single or multi-threaded (e.g., simultaneous multi-processing, Hyperthreading™, etc.). In some embodiments, processors 570 include dynamic scheduling mechanisms 572, such as those capable of delaying speculative stores in load/store queues 574 for implementing a speculative store buffer, as described herein. In some embodiments, processors 570 include various load, store, and/or load/store queues, such as 574, for holding inflight memory operations in the processor pipeline. Processors 570 may also include registers 576, such as rAX, rFLAGS or other special purpose registers, such as ones used for recording nesting depth, transactional mode, or status (active vs. inactive) of a transaction. In some embodiments, processors 570 include any number of ASF hardware transactional memory mechanisms 578, as described herein. For example, ASF mechanisms 578 may include a locked line buffer and/or hardware logic for monitoring memory locations protected by an active transaction. In some embodiments, processors 570 include cache coherence mechanisms 579, which may be used to implement different cache coherence protocols (e.g., MESI, MOESI, etc.) and may be used by ASF mechanisms to detect conflict aborts, as described herein.

The computer system 500 may also include one or more persistent storage devices 560 (e.g. optical storage, magnetic storage, hard drive, tape drive, solid state memory, etc.), which may store files, for example, by using a file system, such as file system 562. Computer system 500 may include one or more memories 510 (e.g., one or more of cache, SRAM, DRAM, RDRAM, EDO RAM, DDR RAM, SDRAM, Rambus RAM, EEPROM, etc.) shared by the multiple processors. Some embodiments may include fewer or additional components not illustrated in FIG. 5 (e.g., video cards, audio cards, additional network interfaces, peripheral devices, a network interface such as an ATM interface, an Ethernet interface, a Frame Relay interface, etc.).

Processors 570, storage device(s) 560, and shared memory 510 may be coupled to system interconnect 550. One or more of the system memories 510 may contain program instructions 520. Program instructions 520 may be encoded in platform native binary, any interpreted language such as Java™ byte-code, or in any other language such as C/C++, Java™, etc or in any combination thereof.

Program instructions 520 may include program instructions executable to implement one or more ASF-based transactional memory applications 522. Each application 522 may be multithreaded and may be configured to utilize ASF transactional memory mechanisms. In some embodiments, one or more of applications 522 are configured to operate using both ASF transactional memory instructions as well as mutual exclusion locks, as described herein. In such embodiments, shared memory 510 may include various data structures and variables 530, any of which may be associated with one or more mutual exclusion locks 540.

In some embodiments, program instructions 520 and/or ASF-based transactional memory applications 522 is provided as an article of manufacture that may include a computer-readable storage medium having stored thereon instructions that may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of tangible medium suitable for storing program instructions. In addition, program instructions may be communicated using intangible media-optical, acoustical or other form of propagated signal (e.g., carrier waves, infrared signals, digital signals, etc.).

Additionally, some embodiments are fabricated using well know techniques that can implemented with a data processing system using code (e.g., Verilog, Hardware Description Language (HDL) code, etc.) stored on a computer usable medium. The code comprises data representations of the circuitry and components described herein that can be used to generate appropriate mask works for use in well known manufacturing systems to fabricate integrated circuits embodying aspects of the disclosed embodiments.

The flowcharts and block diagrams in the figures illustrate the architecture, functionality, and operation of possible implementations of systems, methods and computer program products according to the disclosed embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The disclosed embodiments have been presented for purposes of illustration and description, but is not intended to be exhaustive or limited to the form disclosed. Many modifications and variations will be apparent to those of skill in the art without departing from the scope and spirit of the disclosed embodiments.

For example, the HTM mechanism 145 may be modified to enable transactions that may not be supported by ASF such as large write sets. Protecting large regions may be applicable to large write-sets if no version storage is required. This is the case, for example, for irrevocable transactions such as transactions that are guaranteed to complete. Usually there can only be one such transaction active in the system. But other transactions might execute concurrently. Those would have to be aborted in case of conflict.

Also, for example, the HTM mechanism 145 may be modified to support several page sizes. While the embodiments above are described with respect to last-level PTEs. Those may have any size supported by the architecture. When supporting several page sizes it would be desirable that all threads in a conflict domain use the same page tables. Additionally, the HTM mechanism 145 may be extended to also cover higher levels in the page table. For example, the HTM mechanism 145 might be extended to protect a 2 MB region despite not having a super page mapping for this area. For this modification, the meta-data is also tracked and marked at the desired level by all cores. Additionally, in certain embodiments, super-page mappings could be used without the overhead of the additional meta-data.

Having thus described the embodiments in detail, it will be apparent that modifications and variations are possible without departing from the scope of the embodiments defined in the appended claims.

What is claimed is:

1. An apparatus comprising:
a processor coupleable to a shared memory that is shared by one or more other processors, wherein the processor is configured to execute a section of code that includes a plurality of memory access operations to the shared memory; and
the processor comprising a large region protection module, the large region protection module configured to allow protection of a large region of memory by monitoring meta data relating to the large region of memory, the large region of memory being larger than a memory line, wherein the meta data is not used by an operating system.

2. The apparatus of claim 1 wherein:
the large region protection module comprises a hardware-based transactional memory (HTM) mechanism to track the meta data without operating system support.

3. The apparatus of claim 2 wherein:
the meta data comprises page-table entries (PTE).

4. The apparatus of claim 1 wherein:
the section of code comprises a transaction operation, wherein a translation lookaside buffer includes a transaction operation read bit and a transaction operation write bit to indicate whether an address is contained in the transaction operation's working set a meta level.

5. The apparatus of claim 1 wherein:
the large region is located within at least one of a local read set and a local write set.

6. The apparatus of claim 2 wherein:
the HTM mechanism operates at a cache-line level.

7. A multiprocessor computer system comprising:
a shared memory; and a plurality of processors coupled to the shared memory that is shared by one or more other processors, wherein each of the plurality of processors is configured to execute a section of code that includes a plurality of memory access operations to the shared memory, and each of the plurality of processors comprising a large region protection module, the large region protection module configured to allow protection of a large region of memory by monitoring meta data relating to the large region of memory, the large region of memory being larger than a memory line, wherein the meta data is not used by an operating system.

8. The multiprocessor computer system of claim 7 wherein:
the large region protection module comprises a hardware-based transactional memory (HTM) mechanism to track the meta data without operating system support.

9. The multiprocessor computer system of claim 7 wherein:
the meta data comprises page-table entries (PTE).

10. The multiprocessor computer system of claim 7 wherein:
the section of code comprises a transaction operation, wherein a translation lookaside buffer includes a transaction operation read bit and a transaction operation write bit to indicate whether an address is contained in the transaction operation's working set a meta level.

11. The multiprocessor computer system of claim 7 wherein:
the large region is located within at least one of a local read set and a local write set.

12. The multiprocessor computer system of claim 7 wherein:
the HTM mechanism operates at a cache-line level.

13. In a system comprising a memory shared among a plurality of processors, a method comprising:
executing a section of code via one of the plurality of processors, the section of code comprising a plurality of memory access operations to the shared memory; and
protecting a large region of memory, the large region of memory being larger than a memory line, by monitoring meta data relating to the large region of memory, wherein the meta data is not used by an operating system.

14. The method of claim 13 wherein:
the large region protection module comprises a hardware-based transactional memory (HTM) mechanism to track the meta data without operating system support.

15. The method of claim 13 wherein:
the meta data comprises page-table entries (PTE).

16. The apparatus of claim 13 wherein:
the section of code comprises a transaction operation, wherein a translation lookaside buffer includes a transaction operation read bit and a transaction operation write bit to indicate whether an address is contained in the transaction operation's working set a meta level.

17. The method of claim 13 wherein:
the large region is located within at least one of a local read set and a local write set.

18. The method of claim 14 wherein:
the HTM mechanism operates at a cache-line level.

19. A computer readable medium comprising code stored therein, said code being executable by a processor to fabricate at least one of a plurality of processors of a multiprocessor computer system, the multiprocessor system comprising a shared memory and the plurality of processors, said at least one of the plurality of processors comprising:
a processor core, the processor core being configured to execute a section of code that includes a plurality of memory access operations to the shared memory; and,
a large region protection module, the large object protection module configured to allow protection of a large region of memory by monitoring meta data relating to the large region of memory, the large region of memory being larger than a memory line, wherein the meta data is not used by an operating system.

20. The computer readable medium of claim 19 wherein:
the large region protection module comprises a hardware-based transactional memory (HTM) mechanism to track the meta data without operating system support.

21. The computer readable medium of claim 20 wherein:
the meta data comprises page-table entries (PTE).

22. The apparatus of claim 19 wherein:
the section of code comprises a transaction operation, wherein a translation lookaside buffer includes a transaction operation read bit and a transaction operation write bit to indicate whether an address is contained in the transaction operation's working set a meta level.

23. The computer readable medium of claim 19 wherein:
the large region is located within at least one of a local read set and a local write set.

24. The computer readable medium of claim 20 wherein:
the HTM mechanism operates at a cache-line level.

* * * * *

UNITED STATES PATENT AND TRADEMARK OFFICE
CERTIFICATE OF CORRECTION

| | | |
|---|---|---|
| PATENT NO. | : 8,943,278 B2 | |
| APPLICATION NO. | : 13/563143 | |
| DATED | : January 27, 2015 | |
| INVENTOR(S) | : Pohlack et al. | |

It is certified that error appears in the above-identified patent and that said Letters Patent is hereby corrected as shown below:

IN THE CLAIMS

Claim 4, column 14, line 60, after "working set" insert -- at --.

Claim 10, column 15, line 27, after "working set" insert -- at --.

Claim 16, column 16, line 6, after "working set" insert -- at --.

Claim 22, column 16, line 38, after "working set" insert -- at --.

Signed and Sealed this
Seventh Day of July, 2015

Michelle K. Lee
*Director of the United States Patent and Trademark Office*